INVENTOR.
KENNETH M. WATSON

INVENTOR.
KENNETH M. WATSON
BY Edward W. Lang
ATTORNEY.

United States Patent Office 2,834,656
Patented May 13, 1958

2,834,656

APPARATUS FOR CONDUCTING FLUIDIZATION REACTIONS

Kenneth M. Watson, Lake Zurich, Ill., assignor to The Pure Oil Company, Chicago, Ill., a corporation of Ohio Application December 29, 1953, Serial No. 401,026

8 Claims. (Cl. 23—288)

This invention relates to a process and apparatus for the catalytic conversion of hydrocarbons and is more particularly concerned with methods and apparatus for the operation of such processes wherein a positive pressure differential is maintained and utilized in the system between the principal reaction zone and the regeneration zone.

The invention is applicable to those types of catalytic conversion processes wherein there is a gradual loss of catalyst activity due to the formation and deposition of carbonaceous contaminants on the catalyst surface. As examples of the type of process to which the present invention is applicable may be mentioned catalytic cracking, reforming, hydrogenation, dehydrogenation, aromatization, and desulfurization reactions. Such processes may be carried out in the presence of added or recirculated hydrogen or gases containing or capable of producing free hydrogen. The catalysts used in such operations may consist of oxides or sulfides of metals of the fourth, fifth, sixth, and eighth groups of the periodic system as shown in "Periodic Chart of the Atoms," revised edition, 1941, W. M. Welch & Co. Silica, alumina, magnesia, activated alumina, various clays of the type of bentonite, or montmorillonite may be used alone or in admixture with the aforesaid metal compounds. In all such processes a solid particle contact material is introduced to an enclosed zone operating under pressure for contact with a gaseous material therein. Means must be provided for moving the solid catalyst particles through the respective zones of reaction and regeneration and for introducing and withdrawing the solid catalyst particles to and from the zones without substantial flow of any undesired gases to or from the zones. The present invention is directed to a unitary system of improved design which has several mechanical and operational advantages.

Accordingly, it is an object of the invention to provide a reaction system employing continuous, fluidized reaction and regeneration zones wherein positive separation of the reaction and regeneration zones is maintained at all times during cycles of catalyst transfer.

It is another object of this invention to provide a process and apparatus particularly adaptable to the reforming of straight run naphthas which is advantageously simple and low in cost and providing a minimum of wear of parts in contact with the catalyst stream.

A further object of the invention is to provide a continuous process and apparatus which is applicable to catalytic operations wherein a high rate of catalyst circulation is not required.

Another object of the invention is to provide a process and apparatus for reforming of naphthas wherein a positive pressure differential is maintained between the reaction and regenerating zones by the use of an inert gas carrier system and lock-hopper arrangement whereby at least one closed valve is maintained between the principal zones.

Another object is an improved method of controlling the rate of transfer of fluidized catalyst from one zone to another in a closed cycle without the use of internal moving parts and through coordinated use of controlled block valves.

Still another object is to minimize the tendency to erosion and attrition incident to forcing a stream of fluidized solid through a restricted passageway and at the same time to provide an improved, inexpensive method of reliably preventing any upset or change in the rate or direction of flow of catalyst in such a system due to any fluctuations in the pressure in either contacting zone.

Other objects and advantages of the invention will become apparent as the description thereof proceeds.

Figure 1:
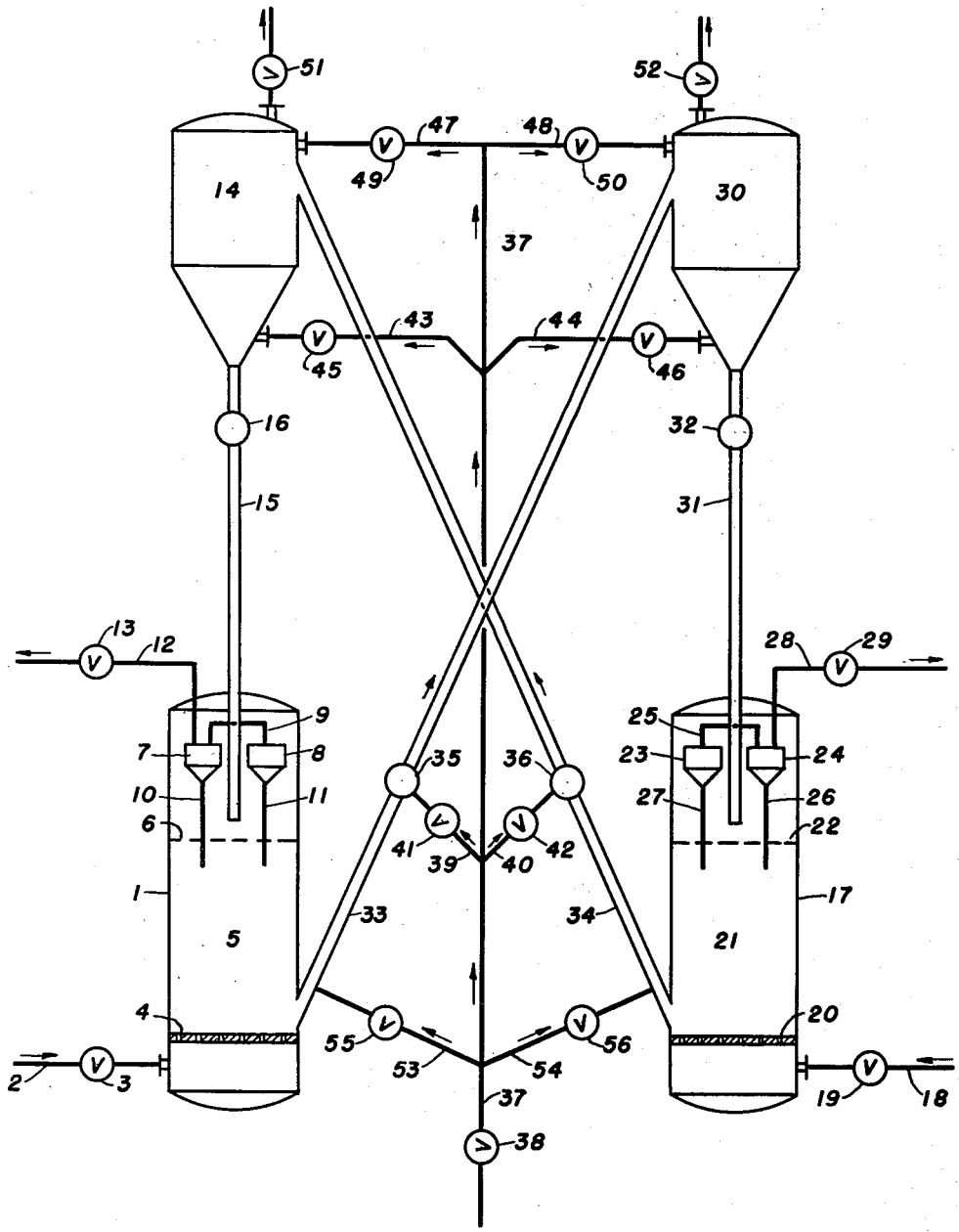
Figure 1 is a diagrammatic representation of one form of apparatus adapted for practicing the invention including a reactor and regenerator suitable for use in the catalytic reforming of straight run naphthas.

Although the invention is applicable to any fluidized catalytic reaction and, in particular, the reactions enumerated, it will be demonstrated by reference to the reforming of naphthas which represents a particularly sensitive reaction as far as the manipulative technique is concerned and the need for the exclusion of extraneous and undesirable gases from the reaction and regenerating zones. Prior art processes along this line, providing for the contact of a solid catalyst in a fluidized state, with gaseous reactants, have the disadvantage of requiring costly and complicated equipment for maintaining continuous circulation of the fluidized catalyst by gravity as a result of density differences which are induced in the operation. In many prior art processes and apparatus, separation of the zones is achieved merely by a seal of fluidized catalyst which is effective against a pressure differential of only a few pounds per square inch. Slight misoperation or failure of the controls may lead to disastrous intermixing of hydrocarbon vapors and air, particularly when the operating pressure level of the process is high. The present invention is designed to preclude such difficulties by providing positive separation of the two zones.

In many of the prior art processes, the catalyst is flowed into the top part of a continuous cracking zone through an elongated catalyst leg which extends above the continuous cracking zone and which is of a sufficient height such that the pressure of the catalyst head in the leg is greater than the pressure in the zone. The catalyst leg empties an accumulation of catalyst at the point it enters the zone so that the catalyst feed is even and the accumulation remains substantially constant. Catalyst from the leg flows into the substantially compact catalyst in the conversion zone at about the same rate at which spent catalyst is withdrawn from near the bottom of the column, thereby maintaining a column of active catalyst within the reaction zone. Simultaneously, spent catalyst is withdrawn from the bottom of the reaction zone by means of a compact leg of catalyst which also presents sufficient resistance to restrict the flow of gases therethrough to a comparatively small quantity. The regeneration zone is operated in a similar manner. In such apparatus, there is the necessity of maintaining a baffling structure or gas flow-assisting structure and also the necessity for the employment of catalyst elevators. As soon as resort is had to a fluidized system, the problem of proper pressure differential between the respective reaction and regeneration zones becomes acute and the danger of intermixing of hydrocarbon vapors and air is amplified.

According to the preferred embodiment of the present invention, the catalyst is contained in a reactor on a horizontal supporting medium which is permeable to vapors but impermeable to catalyst particles and the vapors to be processed enter the reactor below the catalyst support to pass upwardly to the catalyst bed, leaving same through a multiple stage cyclone separator. A similar regeneration zone is maintained for fluid contact of the catalyst with air or other oxidizing or regeneration gases and the by-products therefrom leave the top part of the regeneration zone through a suitable cyclone separator. The bottom portion of the reactor above the catalyst support means is connected by a valved catalyst fill line to a separate spent catalyst hopper located above and connected to the regenerator by means of a downwardly extending valve controlled catalyst conduit. Similarly, the bottom portion of the regeneration zone is connected by a valved catalyst fill line to a regenerated catalyst hopper located above and connected with the reaction zone by means of another downwardly extending valve controlled catalyst conduit. Both catalyst fill lines are fitted with means for injecting inert gas therein to help convey the catalyst therethrough. Both catalyst hoppers are fitted with means for varying the pressure of inert gas therein to values above and below the respective reaction and regeneration zones. Each catalyst hopper is also provided with a valved vent through which pressure can be relieved as desired in carrying cut the steps of the method. The catalyst is circulated between the reaction and regeneration zones at any desired rate in the form of incremental portions by means of sequential positive differential pressures established through the use of varying inert gas pressures so that the catalyst is always flowing from a zone of high pressure to a zone of low pressure within an envelope of inert gas to thereby minimize the incorporation of undesirable gases. The magnitude of pressure differential imposed controls the amount and relative rate of each catalyst transfer. Further, the invention provides for two or more fluidized zones adapted to carry out progressive reactions wherein catalyst transfer and heat of reaction are carefully controlled.

Referring to the drawings, in Figure 1, 1 represents a reactor having inlet 2 controlled by valve 3 for the entry of reactant vapors. Within reactor 1 is located catalyst support means 4 which is pervious to the reactant vapors but impervious to the catalyst particles. 5 represents the fluidized zone, within the reactor 1, which during normal operating conditions will have a top level shown at 6. At the top of reactor 1 are shown two cyclone separators 7 and 8 connected by line 9, having downwardly extending legs 10 and 11 which reach below fluidized zone level 6. Product vapors after separation of catalyst fines leave the reactor through line 12, controlled by valve 13. Reactor 1 is fitted with a hopper 14 having downwardly extending leg 15 which reaches to a point above the fluidized zone level 6. Leg or conduit 15 is controlled by valve 16.

The regeneration system comprises regenerator 17 having inlet 18 controlled by valve 19 for the entry of a regeneration medium. A catalyst support means 20 similar to support 4 in reactor 1 is provided near the bottom of the regenerator. The regenerator is operated under fluidized conditions and the zone of fluidization is represented by 21 having a top level at 22. At the top of the regenerator is located a catalyst fines separation system comprising two cyclone separators 23 and 24, connected by line 25, and having downwardly extending legs 26 and 27 to conduct the separated fines back to the fluidization zone at a point just below the fluidized level. Regeneration gases and by-products or combustion gases pass from the regenerator to the stack by line 28 controlled by valve 29. Regenerator 17 is fitted with a catalyst hopper 30 having downwardly extending leg 31 controlled by valve 32 which reaches to a point above the fluidized zone level 22.

The reactor and regeneration systems are connected by catalyst fill lines 33 and 34. Line 33 leads from the bottom of zone 5 to the top of hopper 30 while line 34 leads from the bottom of zone 21 to the top of hopper 14. The preferred arrangement of reactor, regenerator hoppers, and catalyst fill lines is such that the catalyst fill lines are as near vertical as possible and the junctions with the reactor, regenerator, and respective hoppers are devoid of sharp curves or pockets so that the catalyst being conveyed therethrough will not be obstructed.

Catalyst fill lines 33 and 34, in the embodiment shown in Figure 1, are controlled by special gate valves 35 and 36, respectively, having inert gas bleed-in arrangements adapted to flush the valve seats of catalyst particles during the closing thereof and provide an inert gas seal around the valve plug. One form of valve for this purpose comprises a gate valve of the open and shut variety with a groove around the bottom portion of the plug with an aperture within the valve seat opposite the groove and communicating therewith so that at the moment of closing of the valve the inert gas enters the groove flushing catalyst fines from the seating surfaces. After the valve is closed the inert gas pressurizes the groove and forms an additional seal. This type of open and shut inert gas pressurized valve is an article of commerce. It has been found that valves 35 and 36 are best located above the fluidized catalyst levels 6 and 22 of the respective reactor and regenerator as will be explained.

In order to provide inert gas for valves 35 and 36 and for the pressurizing of the system in accordance with the invention, conduit 37, controlled by valve 38, is shown having branch lines 39 and 40, controlled by valves 41 and 42 leading into gate or plug valves 35 and 36. Conduit 37 continues to the top of the system where branch lines 43 and 44, controlled by valves 45 and 46, lead to the bottom of hoppers 14 and 30, and branch lines 47 and 48, controlled by valves 49 and 50, lead to the top of these hoppers. Inert gas pressuring lines are shown leading to the top and bottom of the hoppers in order to insure equalization of the pressure therein and speed the process of attaining the proper pressure levels. If desired only one conduit may be used leading to each hopper and the design thereof will depend somewhat on the size and shape of the hopper with respect to the type and density of catalyst used and the operating conditions employed. Each hopper is equipped with a vent conduit and control valve shown at 51 and 52. Additional inert gas may be introduced into catalyst fill lines 33 and 34 through lines 53 and 54 equipped with appropriate valves 55 and 56.

The operation of the embodiment shown in Figure 1 is as follows. At the start of a normal cycle hopper 14 is filled with regenerated catalyst while normal fluidized bed levels 6 and 22 are maintained in the reactor 1 and regenerator 17. Hopper 30 is depressurized through vent valve 52. Hopper 14 is then pressured by inert gas from line 37 by opening valves 45 and 49. At the same time valves 36, 16, and 51 are closed. When it is desired to add catalyst to reactor 1, valve 16 is opened discharging catalyst from hopper 14 into the reactor as a result of the pressure supplied by the inert gas through line 47. Simultaneously, spent catalyst is withdrawn from the reactor 1 by opening valve 35 in line 33 which allows catalyst to flow upward into the depressured hopper 30 which was vented to a pressure substantially lower than that in the reactor. Valves 32 and 36 have remained closed during this operation. The operation thus far has amounted to a replacement of a portion of the catalyst in zone 5 by regenerated catalyst from hopper 14 and removal of a portion of the catalyst in zone 5 to hopper 30. The amount of catalyst transferred in one cycle can be regulated by means of the pressure to which hopper 30 is vented. Catalyst flow will cease when the pressure in hopper 30 is equal to that in reactor 1. Fluidization in the carrier line 33 is assisted and loss of hydrocarbons from the reactor minimized by admitting inert gas through line 53 and valve 55. After the pressure in hopper 30 is equalized with that in the reactor, valves 35, 55, and 16 are closed along with valves 45 and 49.

The catalyst in hopper 30 may be maintained in a fluidized state by admitting a slow stream of inert gas through line 44. This gas may be vented through valve 52 to maintain the desired pressure in the hopper 30. This fluidization gas also serves to displace hydrocarbon vapors which may be entrained in the spent catalyst and the vent gas may be diverted to the product recovery system (not shown) during the stripping period. After stripping, the catalyst in hopper 30 is added to the regenerator 17 by pressuring the hopper with inert gas passing through line 48 and valve 50 to a level substantially higher than that existing in the regenerator 17. Valve 32 is then opened, allowing catalyst to flow via leg 31 into the regenerator. Simultaneously, with this operation regenerated catalyst is withdrawn from the regenerator by opening valve 36 in line 34 which will permit catalyst to flow upward to hopper 14, which has previously been vented to a pressure substantially lower than that existing in the regenerator 17 by adjustment of vent valve 51. Transfer of the catalyst is facilitated and contamination with oxygen-containing gas is minimized by introducing inert gas into the carrier line 34 through valve 56. When the pressure in hopper 14 is equalized with that in the regenerator, valves 36 and 56 are closed. Fluidization and stripping gas is admitted through line 43 and valve 45, restoring the conditions at the start of the transfer cycle. This operation has resulted in the simultaneous transfer of a portion of the catalyst from hopper 30 to regenerator 17 and transfer of a portion of catalyst from the regenerator to hopper 14. Valves 16 and 35 remained closed.

In this manner, the catalyst is circulated between the reactor and regenerator at any desired rate through the maintenance of a positive pressure differential, thus eliminating the danger of backflow or accidental intermixing of oxidizing atmosphere with the hydrocarbons. At all times the reactor and regenerator are separated by at least one closed valve, yet substantially continuous flow is maintained under fluidized conditions. By adjustment of the pressure differential maintained to initiate and complete catalyst flow in each cycle the amount or volume or catalyst transfer is controlled as desired by the operator.

Figure 2:
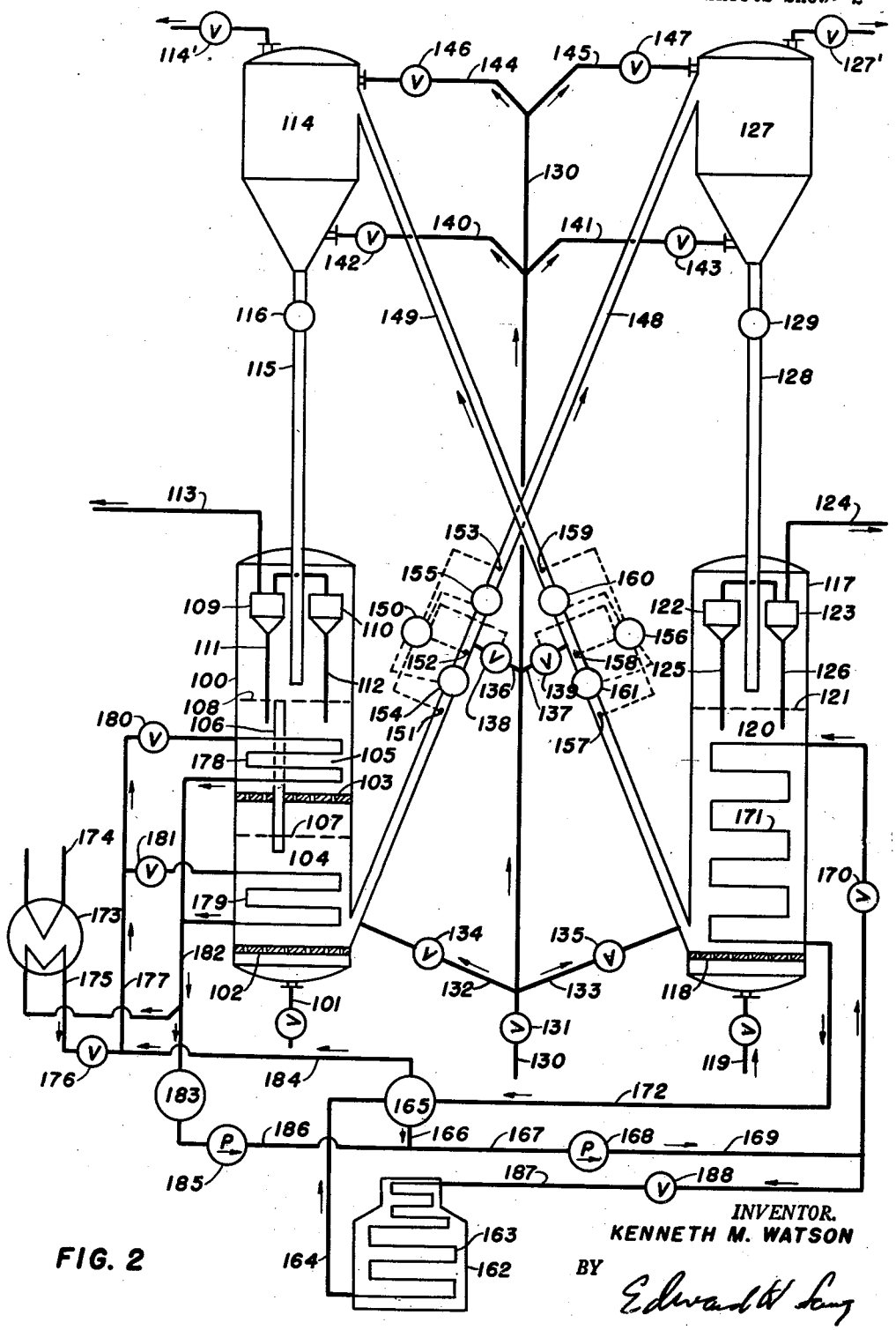
Figure 2 is an alternate design embodying the same fundamental principles in a multiple zone reactor in conjunction with a single regeneration zone.

Referring to Figure 2, another embodiment of the invention is shown which is designed specifically for hydrocarbon conversion reactions wherein one of the principal problems is temperature control, such as found in hydrocarbon conversions as catalytic reforming. The valve manipulation employed to attain catalyst transfer in Figure 2 is the same as that described in connection with the operation of Figure 1 with the added feature of automatic control of the amount of catalyst for each cycle in proportion to the differential pressure asserted. In Figure 2, a diagrammatic representation, 100 represents a reactor having inlet 101 for the entry of hydrocarbons to be reformed. Located within reactor 100 are two catalyst support means 102 and 103, defining two distinct reaction zones 104 and 105 within the reactor. The support means are pervious to reactant vapors and impervious to the catalyst particles. A downcomer 106 connects between the top of zone 105 to within zone 104. The downcomer is shown diagrammatically and ordinarily would be equipped with a seal pot (not shown) at the bottom thereof to prevent the upflow of reactants from zone 104 to zone 105. The top levels of the respective zones are represented at 107 and 108. At the top of reactor 100 are shown two cyclone separators 109 and 110 having downwardly extending legs 111 and 112 which reach below fluidized zone level 108. Product vapors leave the reactor 100 through line 113.

Reactor 100 is fitted with a hopper 114 equipped with vent valve 114' and having downwardly extending leg 115, which reaches to a point above the fluidized zone level 108. Leg or conduit 115 is controlled by valve 116.

The regeneration system comprises regenerator 117 having catalyst support means 118 at the bottom thereof. Regeneration or combustion gases enter the regenerator through line 119 and maintain the catalyst within a fluidized zone 120 having a top level indicated at 121. As in the reactor, the regenerator is fitted with two cyclone separators 122 and 123, which function in the same manner as the cyclone separators shown in Figure 1. Combustion gases from the regeneration pass to the stack via line 124 and catalyst fines separated return to within the fluidized zone 120 via legs 125 and 126. Hopper 127, equipped with vent valve 127', connects to a point above the fluidized zone 120 by means of downwardly extending legs 128 controlled by valve 129.

Inert gases for controlling and pressurizing the system enter through line 130 controlled by valve 131 and proceed through branch lines 132 and 133, controlled by valves 134 and 135; branch lines 136 and 137 controlled by valves 138 and 139; branch lines 140 and 141 controlled by valves 142 and 143 and branch lines 144 and 145 with associated valves 146 and 147. Two catalyst fill lines 148 and 149 connect the reactor and regeneration systems. Line 148 extends from the bottom of fluidized zone 104 of the reactor to the top of hopper 127 and line 149 extends from the bottom of regeneration zone 120 to the top of hopper 114. Inert gas branch lines 132 and 133 enter lines 148 and 149, respectively, at their bottoms and may be used to inject inert gases therein to maintain the catalyst in the fill lines in a fluidized condition as it passes therethrough. Likewise, branch lines 140 and 141 communicate with the bottoms of the hoppers and branch lines 144 and 145 communicate with the tops of the hoppers for flushing and repressuring purposes, to be described.

An automatic system for controlling the amount of catalyst flowing through lines 148 and 149 at any one cycle of catalyst transfer is shown in Figure 2. This system comprises, for each fill line, a differential pressure controller, pressure sensing units, and a pair of block valves. These are shown for line 148 as differential pressure controller 150, pressure sensing units 151, 152, and 153, and block valves 154 and 155. The necessary wire connections between the differential pressure controller, the sensing units, the inert gas valve 136, and valves 154 and 155 are indicated by the dotted lines. Similarly, differential pressure controller 156, sensing units 157, 158, and 159, and block valves 160 and 161 are connected to control catalyst fill line 149.

Controllers 150 and 156 are of the ordinary type used to sense a pressure differential between pressure sensing units and open and close the block valves in timed sequence. A time controller provides the overall dominating control of the operation of the entire apparatus, but the differential pressure control through double valves subserves to ensure safe operation and prevent any opening of the valves when, for any reason, the pressure gradient is not in the proper direction or of the proper magnitude. Thus, for example, when the pressure in line 148 between valve 155 and the regenerator hopper 127, and between valves 154 and 155, is lower than that in line between valve 154 and the reactor, valve 154 will be opened followed in timed sequence by the opening of valve 155 to allow the flow of catalyst therethrough. Between the time of opening of valves 154 and 155, inert gas may be admitted through valve 138 to aid in the transfer of catalyst. When the pressure in line 148 between valve 155 and the regenerator hopper 127 becomes the same, or higher, than the pressure between valve 155 and reactor 100, valve 155 will be closed followed in sequence by the closing of valve 154. During the closing of valves 155 and 154, inert gas at a slightly higher pressure may be admitted through valve 138 to aid in freeing the valve seats of catalyst. The same sequence of events is made to take place in operation of valves 160 and 161 in catalyst fill line 149.

As an alternative arrangement, not shown in the drawing, the amount of flow of catalyst through lines 148 and 149 may be controlled by placing an ordinary pressure control in each inert gas conduit 136 and 137, conducting the inert gas to two points between the slide valves by means of two inert gas branch lines, and providing a large bleed orifice in one branch line and a small constant bleed orifice in the other. Such an arrangement, although eliminating the necessity of a differential pressure controller for each catalyst fill line and the wiring connections shown, is not a preferred embodiment.

For the purpose of controlling the heat of reaction and regeneration, the apparatus shown in Figure 2 includes a heat transfer system comprising a combination steam heating arrangement for exothermic operation and a liquid transfer system for endothermic operation. In the heat control system heater 162 is fitted with coil 163 connected with line 164 to vapor disengaging drum 165. Line 166 leads from drum 165 to line 167, pump 168 into line 169 controlled by valve 170 to coil 171 in the regenerator. Return line 172 leads back to drum 165. Steam generator 173 is provided with coil 174 and heat transfer line 175 controlled by valve 176 leads therefrom into line 177, controlled by valve 176, connecting with coils 178 and 179 within zones 104 and 105 of the reactor. Valves 180 and 181 control the flow therethrough. Return line 182 leads back to steam generator 173 and to accumulator trap 183. Line 184 connects drum 165 with line 177. Pump 185 in line 186 conveys condensate from trap 183 back to the system.

For the purpose of controlling the heat of reaction and regeneration, a high-boiling liquid is used as a liquid-vapor heat exchange medium. The heat transfer material may be any high-boiling liquid such as mercury, phosphorus pentasulfide, or other phosphorus-sulfur compounds, as just described. Both fluidized reaction zones are fitted with coils through which vapor of the heat-exchange material is circulated, and the regeneration zone is fitted with coils through which heat-exchange liquid is circulated. Where the net thermal effect of reaction plus regeneration is exothermic, the heat balance is maintained by utilizing the heat from the condensation of excess heat-transfer vapors for generating steam in coil 174. Thus in such cases heater 162 for the heat-exchange medium is needed only in starting up and is shut down during normal operation. Where the net thermal effect of the process is endothermic, the heater 162 is used to vaporize the heat-exchange liquid and supply the heat necessary to maintain a heat balance. When there is a highly exothermic net thermal effect, as is the case in catalytic reforming when a large amount of carbon is formed, one of the principal problems is in the control of temperature in both the reactor and regenerator.

Figure 2 shows an effective means of handling this problem. Heat transfer liquid is raised to a suitable temperature by circulation through coil 163 in heater 162, and is conducted to vapor disengaging drum 165 by line 164. Vapors from this drum pass along lines 184 and 177, through valves 180 and 181, and through coils 178 and 179 situated in reaction zones 104 and 105, thus permitting control of the temperature of each reaction zone by the rate of admission of vapor to it. This arrangement is particularly advantageous because of the extremely high heat coefficients which exist between condensing vapors giving up heat and the fluidized catalysts in the endothermic reaction zones. Condensed heat-exchange material is returned via line 182 to the circulating system by pump 185 operating accumulator trap 183. With a large quanity of carbonaceous material being burned off in regenerator 117, excess hot vapor is run from lines 172 and 184 through valve 176 and line 175 in steam generator 173 containing water coil 174 to produce steam.

Heat-exchange liquid proceeds from pump 185 via lines 186 and 167, pump 168, line 169, and valve 170 to coil 171 in regeneration zone 120 where it is vaporized by the heat of the combustion reactions occurring therein. Vaporized heat-transfer medium returns to vapor drum 165 via line 172 to complete the cycle. Any heat-exchange liquid in vapor drum 165 is returned to lines 186 and 167 via line 166.

When the over-all net thermal effect is endothermic, heat-exchange liquid is taken from line 169 between pump 168 and valve 170 and returned via line 187, controlled by valve 188, to heater 162.

The foregoing considerations examplified by Figure 2 are predicated upon an endothermic reaction in reactor 100. Since the reactions in the regenerator are exothermic, the over-all net thermal effect is endothermic or exothermic depending upon the quantities of heat involved in the two sections. However, when the reaction in the reactor is exothermic, as for example in the catalytic synthesis of methanethiol from hydrogen sulfide and methanol, the over-all net thermal effect is always exothermic and the embodiment illustrated in Figure 2 must be modified to permit a reverse type of flow of heat-exchange medium wherein liquid medium is circulated through the coils in both reactor and regenerator to absorb heat, and said heat then is given up by heat-exchange vapor to water in the steam generator.

In applying the foregoing apparatus to the reforming of naphthas for octane number improvement, the following ranges of operating conditions are preferred:

Catalyst: Copper-molybdena-alumina; molybdena-alumina; or cobalt-molybdena-alumina
Reactor temperature: 850–975 ° F.
Reactor pressure (gauge): 150–500 lb./sq. in.
Linear velocity in reactor: 0.2–1.5 ft./sec.
Space velocity in reactor: 0.25–3.0
Hydrogen/hydrocarbon molal ratio in reactor feed: 2.5/1–10/1
Regenerator temperature: 1000– 1200 ° F.
Regenerator pressure (gauge): 0–200 lb./sq. in.

In a specific example, a Mid-Continent straight run naphtha having the following physical and chemical properties was reformed at the indicated conditions:

Naptha charge:
   A. P. I. gravity_____ 51.9
   ASTM distillation range, °F_____ 256 to 402
   Research octane number_____ 33.6
Hydrocarbon analysis:
   Vol. percent naphthenes_____ 42
   Vol. percent paraffins_____ 45
   Vol. percent aromatics_____ 13
   Vol. percent olefins_____ 0
Reforming catalyst: Co-precipitated copper-molybdate-alumina gel having composition of 6% copper, 22.5% $MoO_3$ and 71.5% alumina gel.
Operating conditions:
   Reactor pressure, p. s. i. g_____ 250
   Reactor temperature, ° F_____ 890
   Space velocity (LVHSV)_____ 3.0
   Hydrogen/hydrocarbon ratio_____ 2.5
Product yield:
   $C_5$+reformate, vol. percent_____ 90.0
   Butanes, vol. percent_____ 4.3
   $C_3$'s and lighter gases, wt. percent_____ 6.2
   Coke, wt. percent_____ 0.5
Research Octane No.:
   $C_5$+gasoline (clear)_____ 80.0
   $C_5$+gasoline+3 ml. TEL_____ 92.0
   10# RVP gasoline (clear)_____ 81.8
   10# RVP gasoline+3 ml. TEL_____ 92.9

The operation of the catalyst transfer cycle of Figure 2, in order to carry out a reforming reaction in accordance with the example just cited, is the same as described in connection with Figure 1. The actual manipulation of valves may be carried out by hand. However, in actual practice, a time cycle controller (not shown) would be used to automatically open and close the necessary valves to carry out a given catalyst transfer cycle. Such a time cycle controller may comprise a motor-driven time control adapted to actuate the individual valves either electrically or through air pressure, which predetermined time intervals are regulated by the known rate of catalyst decline for any given reaction. Such a time cycle controller may comprise a Sangamo time switch, a Paragon time switch, or a Fisher time cycle regulator. These instruments are well known and are commercially available. In the embodiment shown in Figure 2, an added expedient of controlling the amount of catalyst in accordance with the differential pressure asserted is employed in the form of differential pressure controllers 150 and 156. Accordingly, the sequence of events taking place during a catalyst transfer cycle or operation may be described as follows.

Assuming that hopper 114 is filled with regenerated catalyst at the end of a given period of operation while the normal fluidized bed levels 107 and 108 in reactor 100 and zone level 121 in regenerator 117 are maintained, the pressure in hopper 127 is released through vent valve 127'. The pressure in hopper 114 is then increased by injection of inert gas through lines 140 and 144 by opening valves 142 and 146. At the same time valves 160 and 161, valve 116, and vent valve 127' are closed. When it is desired to add catalyst to reactor 100, valve 116 is opened and simultaneously therewith valves 154 and 155 are opened in sequence as determined by the differential pressure being maintained and sensed by pressure controller 150. This allows catalyst to flow from zone 104 through line 148 into depressurized hopper 127 under the pressure from the reactor. The flow of catalyst within catalyst fill line 148 is maintained in a fluidized state by inert gas flowing through line 132. Hopper 127 is at a pressure sufficiently lower than the pressure in reactor 100 to initiate and complete the flow of a desired incremental amount of catalyst. The period of rise and fall of the pressure during the shifting of the increment of catalyst automatically opens and closes block valves 154 and 155 in sequence through the functioning of controller 150 as previously described. The sequence of events taking place during the transfer of spent catalyst into regenerator 117 and regenerated catalyst therefrom is the same as described for the reactor and is accomplished by identical manipulation of corresponding valves in the regeneration system.

The present invention, accordingly, provides an apparatus and method for conducting fluidized reactions wherein the increasing and decreasing of pressure within hoppers and catalyst fill lines associated with a reactor and regenerator create a differential pressure whereby incremental transfer of catalyst to and from the reactor and regenerator in alternate cycles is attained. The primary purpose of the invention, namely, the application of the fluidized technique to hydrocarbon conversion reactions and organic syntheses whereby advantage may be taken of the uniformity of temperature, better temperature control, reduction of side reactions and coking, and longer catalyst life attendant with such technique as opposed to fixed bed operation is thereby accomplished. By conducting the catalyst transfer cycles in accordance with the examples given, there is maintained at all times a positive separation of reaction and regeneration zones not dependent upon pressure seals, there being at least one closed valve between reactor and regenerator at all times. In addition, the invention allows control of the rate of catalyst circulation to the optimum value for a given reaction so that constant high catalytic activity can be maintained without resort to excessive catalyst circulation rates. The invention also minimizes wear of parts exposed to the fluidized catalyst stream and greatly eliminates catalyst attrition. The danger of accidental mixing of reactant vapors and air and inefficient operation which usually accompanies fluctuation in the rate of catalyst flow or change of direction of catalyst flow are eliminated. Furthermore, the use of multiple bed operation in combination with heat control, as described in Figure 2, gives better product distribution, increased product yield, eliminates or reduces the necessity of recirculation of end products and reduces the opportunity for secondary reactions which destroy the desired products.

Any type of catalyst may be used in carrying out the process of the invention as long as it is suitable to promote the reaction intended and is adapted to fluidization conditions. Fluidizable hydrocarbon conversion catalysts and synthesis catalysts are well known and need not be further characterized for purposes of this invention. A preferred species of catalyst for the reforming reaction has been set forth in the example.

In the operation of the apparatus, a differential pressure between the lock-hoppers and the reaction or regeneration zones during any given cycle of catalyst transfer may be in the order of 8 to 15 pounds per square inch. Where, as in a commercial unit, relatively large incremental portions of catalyst are to be transferred, a differential pressure of as high as 20 to 30 pounds per square inch may be necessary in order to effect the transfer with a minimum amount of time and avoid stoppages within the various conduits.

In the design of the apparatus, it has been found that the catalyst fill lines 33 and 34 (Figure 1) and 148 and 149 (Figure 2) should be positioned so that they are as nearly vertical as possible and so that their junctures with the reactor, regenerator, and hoppers create no uneven surfaces or pockets that would hinder catalyst flow. Another important consideration discovered during the manipulation of a laboratory scale model of the apparatus is that the control valves within the catalyst fill lines should be at least as high as and preferably above the top level of the fluidized reaction and regeneration zones with which the catalyst fill lines communicate. Thus, in Figure 1, valve 35 is above zone level 6; valve 36 is above zone level 22, and in Figure 2 lowermost block valve 154 is above level 107 and preferably also above level 108; and lowermost valve 161 is above level 121. The catalyst support means 4 and 20 of Figure 1 and 102, 103, and 118 of Figure 2 are made of any suitable material which is permeable to reactant vapors and does not allow the downflow of catalyst particles. Such a support may comprise a perforated metal plate on which is arranged a bed of pebbles or refractory balls graded in size from coarse at the bottom to fine at the top. Other support means comprise a porous stainless steel or foraminous plate. The regenerating gases used in the system may be any oxygen-containing gases including air and oxygen with or without admixed diluent gases. The inert gases used in the system may comprise any inert medium which is not reactable with the components of the system, does not decompose under the conditions existing therein, and does not form explosive mixtures with the regenerating gases. For this purpose, nitrogen is a preferred inert gas.

During the catalyst transfer cycles of this invention, the reaction and regeneration zones are maintained under substantially constant conditions. There is no interruption of the basic reactions taking place therein, except so far as minor variations in catalyst activity in the former or oxidation demand in the latter may occur as incidental to the catalyst changes taking place.

Although the invention has been described in connection with specific embodiments, it is to be understood that the only limitations attaching thereto appear in the appended claims.

What is claimed is:

1. An apparatus for conducting fluidized reactions comprising a reactor having a fluidized reaction zone, a regenerated catalyst hopper above said reactor, said catalyst hopper having a downwardly extending catalyst conduit communicating with said reaction zone, means for controlling the flow of catalyst through said conduit, a regenertor having a fluidized catalyst regeneration zone, the top of said fluidized regeneration zone being at substantially the same level as the top of said fluidized reaction zone, a spent catalyst hopper above said regenerator, said spent catalyst hopper having a downwardly extending catalyst conduit communicating with said regeneration zone, means for controlling the flow of catalyst through said conduit, a catalyst fill line communicating between said reaction zone and said spent catalyst hopper, a second catalyst fill line communicating between said regeneration zone and said regenerated catalyst hopper, valve means within each of said fill lines for controlling the flow of catalyst therethrough, said valve means being above the top levels of said fluidized reaction and regeneration zones, a source of inert gas under pressure higher than the pressure in said reactor and regenerator, means for conducting said inert gas into said valve means within said first and second fill lines to sweep the catalyst particles therefrom on closing of same, with means for increasing and decreasing the pressure within said hoppers to create a pressure differential between said regenerated catalyst hopper and said reactor and between said spent catalyt hopper and said regenerator whereby incremental transfer of catalyst to and from reactor and regenerator in alternate cycles may be accomplished.

2. An apparatus in accordance with claim 1 in which the valve means for controlling the flow of catalyst through each of said two catalyst fill lines comprises a gate valve, the valve seat of which is pressurized with inert gas from said source of inert gas.

3. An apparatus in accordance with claim 1 in which the means for controlling the flow of catalyst through each of said catalyst fill lines comprises a pair of spaced block valves, pressure sensing units are located on each side of said valves within said fill lines, said pressure sensing units being connected to a pair of differential pressure controllers adapted to open and close said block valves for a length of time proportional to the differential pressure created to control the amount of catalyst transfer in each alternate cycle.

4. An apparatus in accordance with claim 1 which includes means for continuously circulating a high boiling point heat-exchange medium in indirect contact with said regeneration zone to extract heat therefrom and produce vapors of said heat-exchange medium, and means for circulating said vaporous heat-exchange medium in indirect contact with said reaction zone to impart heat thereto.

5. An apparatus for conducting progressive fluidized reactions comprising a reactor, a pair of spaced horizontal catalyst support means within said reactor, each of said support means adapted to distribute reactants and catalyst particles across the cross-sectional area of said reactor in separate upper and lower fluidized zones, a downcomer leading from the top of the uppermost fluidized zone to within the lower fluidized zone, said downcomer providing a path for the continuous transfer of catalyst from the uppermost zone to the lowermost zone, a regenerated catalyst hopper above said reactor, a downwardly extending catalyst conduit leading from said hopper to said uppermost fluidized reaction zone, means for controlling the flow of catalyst through said conduit, a regenerator having a fluidized catalyst regeneration zone, the top of said fluidized regeneration zone being at substantially the same level as the top of said upper fluidized reaction zone, a spent catalyst hopper above said regenerator, a downwardly extending catalyst conduit leading from said hopper to said regeneration zone, a catalyst fill line communicating between said lowermost reaction zone and said spent catalyst hopper, a second catalyst fill line communicating between said regeneration zone and said regenerated catalyst hopper, valve means within each of said fill lines for controlling the flow of catalyst therethrough, said valve means being above the top levels of said fluidized upper reaction zone and said regeneration zone, a source of inert gas under pressure higher than the pressure in said reactor and regenerator, means for conducting said inert gas into said valve means within said first and second fill lines to sweep the catalyst particles therefrom on closing of same, means for increasing and decreasing the pressure within said hoppers to create a pressure differential between said regenerated catalyst hopper and said uppermost fluidized reaction zone, between said lowermost fluidized reaction zone and said spent catalyst hopper, and between said spent catalyst hopper and said regeneration zone whereby incremental transfer of catalyst portions to and from said zones of said reactor and to and from the zone of the regenerator in alternate cycles without subjecting said valve means to closing against catalyst particles is accomplished.

6. An apparatus in accordance with claim 5 in which the valve means for controlling the flow of catalyst through each of said two catalyst fill lines comprises a gate valve, the valve seat of which is pressurized with inert gas from said source of inert gas.

7. An apparatus in accordance with claim 5 in which the means for controlling the flow of catalyst through each of said catalyst fill lines comprises a pair of spaced block valves, pressure sensing units are located on each side of said valves within said fill lines, said pressure sensing units being connected to a pair of differential pressure controllers adapted to open and close said block valves for a length of time proportional to the differential pressure created to control the amount of catalyst transfer in each alternate cycle.

8. An apparatus in accordance with claim 5 which includes means for continuously circulating a high boiling point heat-exchange medium in indirect contact with said regeneration zone to extract heat therefrom and produce vapors of said heat-exchange medium, and means for circulating said vaporous heat-exchange medium in indirect contact with both of said reaction zones to impart heat thereto.

References Cited in the file of this patent

UNITED STATES PATENTS

| | | |
|---|---|---|
| 2,274,003 | Sheppard | Feb. 24, 1942 |
| 2,411,996 | Kassel | Dec. 3, 1946 |
| 2,420,129 | Flock et al. | May 6, 1947 |
| 2,488,030 | Scheineman | Nov. 15, 1949 |
| 2,642,381 | Dickinson | June 16, 1953 |
| 2,700,015 | Joyce | Jan. 18, 1955 |